(12) United States Patent
Ghaffari et al.

(10) Patent No.: US 6,169,483 B1
(45) Date of Patent: Jan. 2, 2001

(54) SELF-CHECKOUT/SELF-CHECK-IN RFID AND ELECTRONICS ARTICLE SURVEILLANCE SYSTEM

(75) Inventors: Touraj Ghaffari; Gary M. Shafer, both of Boca Raton; James R. Gruszynski, Margate; Philip J. Parker, Delray Beach; Richard L. Copeland, Boca Raton, all of FL (US)

(73) Assignee: Sensormatic Electronics Corporation, Boca Raton, FL (US)

(*) Notice: Under 35 U.S.C. 154(b), the term of this patent shall be extended for 0 days.

(21) Appl. No.: 09/304,676

(22) Filed: May 4, 1999

(51) Int. Cl.[7] .................................................. G08B 13/14
(52) U.S. Cl. ...................... 340/572.3; 360/572.1; 360/568.1; 361/149; 700/225
(58) Field of Search ............... 340/572.1, 568.1, 340/572.3; 361/149, 155, 156; 700/225

(56) References Cited

U.S. PATENT DOCUMENTS

| | | | |
|---|---|---|---|
| 3,765,007 | 10/1973 | Elder | 340/572.3 |
| 4,084,742 | 4/1978 | Silverman | 235/383 |
| 4,141,078 | 2/1979 | Bridges et al. | 235/375 |
| 4,617,603 | * 10/1986 | Johnson et al. | 361/149 |
| 4,829,397 | * 5/1989 | Vernikov et al. | 361/149 |
| 4,881,061 | 11/1989 | Chambers | 340/572.1 |
| 5,005,125 | 4/1991 | Farrar et al. | 705/28 |
| 5,059,951 | 10/1991 | Kaltner | 340/572.3 |
| 5,151,684 | * 9/1992 | Johnsen | 340/568.1 |
| 5,288,980 | 2/1994 | Patel et al. | 235/381 |
| 5,341,125 | * 8/1994 | Plonsky | 340/572.3 |
| 5,500,640 | 3/1996 | Zhou et al. | 335/284 |
| 5,710,540 | 1/1998 | Clement et al. | 340/572.4 |
| 5,729,200 | 3/1998 | Copeland et al. | 340/551 |
| 5,777,884 | * 7/1998 | Belka et al. | 700/225 |
| 5,781,111 | * 7/1998 | Easter et al. | 340/572.3 |
| 5,814,799 | 9/1998 | Swartz et al. | 235/383 |
| 5,859,587 | * 1/1999 | Alicot et al. | 340/572.8 |
| 5,874,896 | 2/1999 | Lowe et al. | 340/572.1 |
| 5,963,134 | * 10/1999 | Bowers et al. | 340/572.1 |

FOREIGN PATENT DOCUMENTS

| | | |
|---|---|---|
| PCT/US98/14637 | 7/1998 | (WO). |

\* cited by examiner

*Primary Examiner*—Benjamin C. Lee
(74) *Attorney, Agent, or Firm*—Rick F. Comoglio; Paul T. Kashimba

(57) ABSTRACT

A self-checkout/self-check-in and electronic article surveillance (EAS) system is provided. EAS tags and radio frequency identification (RFID) tags are connected to articles for use with the invention. A preferred embodiment for self-checkout includes a housing having a cavity for receiving articles for self-checkout. The cavity is disposed within a deactivation zone. The RFID tags are read, and after verification of an authorized transaction, a deactivation antenna is energized to deactivate the EAS tags, and a stored inventory database is updated. Information about the transaction can be displayed. A preferred embodiment for self-check-in includes an elongated housing into which articles are deposited for return. Once deposited, the articles pass through the housing and out the other end. As the articles are deposited, the RFID tags on the articles are read, the inventory database is updated, and an activation antenna is energized to form an activation zone through which the articles pass as they fall through the housing, thus activating the attached EAS tags. The magnetic fields used for activation and deactivation are magnetic media safe for use with articles containing magnetic recording media.

44 Claims, 11 Drawing Sheets

SELF-CHECKOUT/SELF-CHECK-IN RFID AND ELECTRONICS ARTICLE SURVEILLANCE SYSTEM

CROSS REFERENCES TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

This invention relates to a self-checkout/check-in system incorporating radio frequency identification (RFID) and electronic article surveillance (EAS), and more particularly to a self-checkout/check-in system for self-rental and/or purchase of audio and video products, libraries, and other asset or inventory tracking applications.

2. Description of the Related Art

EAS systems are well known for the prevention or deterrence of unauthorized removal of articles from a controlled area. In a typical EAS system, EAS markers or tags designed to interact with an electromagnetic field located at the exits of the controlled area are attached to articles to be protected. If an EAS tag is brought into the electromagnetic field or "interrogation zone", the presence of the tag is detected and appropriate action is taken, such as generating an alarm. For authorized removal of the article, the EAS tag can be deactivated, removed or passed around the electromagnetic field to prevent detection by the EAS system. For check-in or return of the article to the controlled area, the EAS tag must be activated or re-attached to once again provide theft deterrence. Because of the desirability of source tagging, in which EAS tags are applied to articles at the point of manufacturing or distribution, it is preferable that the EAS tags are deactivatable and activatable rather than removed from the articles. In addition, passing the article around the interrogation zone presents other problems because the EAS tag remains active and can interact with EAS systems in other controlled areas inadvertently activating those systems.

In addition to EAS, there is presently a need to provide self-checkout and self-check-in of articles from controlled areas by automatically gathering data about the article and correlating that data with stored inventory, pricing, and authorization data. The data can be any data gathered, stored, or used pertaining to an article or object to be protected, monitored, retained, sold, inventoried, or otherwise controlled or distributed in some manner. For example, for self-checkout/check-in, a retail establishment, such as a video rental store, must gather information pertaining to article identification, price, and inventory, as well as checkout authorization and/or payment data. After capturing the relevant inventory data, the establishment must then activate or deactivate the EAS labels attached to the articles and update an inventory database.

There are presently systems known that provide for activation/deactivation of EAS labels tied to scanning and capture of data associated with an article for automated checkout applications. Capture of data is accomplished through the use of bar codes. Presently, bar codes can provide some of the data that is needed to be captured. However, bar codes can only provide a small amount of read only data and the bar code reader or scanner must be visually aligned with the bar code to properly read the bar code, slowing the checkout or inventory process, as well as creating problems when used for self-checkout/check-in.

U.S. Pat. No. 5,777,884, to Belka et al., discloses an article inventory and tracking system that can be used for self-checkout/check-in. The system of the '884 patent consists of a receiving compartment specifically designed to receive an article such as a videocassette in a specific orientation. The videocassette has a bar code and EAS label attached to known locations such as the top for the bar code and on a specific edge for the EAS label. When a cassette is placed within the receiving compartment, the bar code and the EAS label must always be positioned in the same known locations. A bar code reader or scanner can read the bar code data, and the EAS label can be activated or deactivated according to the particular transaction.

The bar code must be oriented in "line of sight" with the bar code reader for proper data capture. The bar code reader must be pre-positioned so that the bar code on the cassette will be in "sight" of the bar code when the cassette is positioned within the compartment. Only one bar code can be read at a time.

The EAS label utilized in the '884 patent, as disclosed in U.S. Pat. No. 3,765,007, requires a relatively high magnetic field level for activation and deactivation, which can degrade prerecorded magnetic media. Activation and deactivation is accomplished by exciting a coil wound around a magnetic core. The air cap of the core is very small, producing a magnetic field that is very high at the gap and falls off rapidly away from the gap. The high gradient of the non-uniform magnetic field thus produced provides the ability to prevent harm to the videotape. If the EAS label is positioned in close proximity to the activator/deactivator antenna, the field levels can be adjusted high enough for activation/deactivation, and because the field level falls off rapidly, the videotape is not damaged.

Thus, the '884 disclosure contains several limitations. In the '884 disclosure, only one cassette at a time can be placed within the receiving compartment, in a fixed orientation, for bar code data capture and activation/deactivation of an EAS label. The use of bar code data capture limits the amount of data that can be captured and requires the bar code reader to be aligned with the bar code, which requires a specific position or location for bar code placement on the cassette, and a specific placement of the cassette.

The EAS label also must always be positioned in the same location on the cassette, and the cassette must be positioned in a specific orientation to activate/deactivate the EAS label and to prevent harm to the magnetic media from the activation/deactivation field. The EAS label must be positioned on the cassette so that the EAS label is proximate the EAS activation/deactivation antenna so the field can be high enough for activation/deactivation near the EAS label, and low enough near the magnetic media to prevent damage to the recording thereon. If the cassette is placed into the activation/deactivation electromagnetic field in an orientation other than with the EAS label proximate the EAS antenna, the magnetic media will be damaged due to the high field level that must be generated for activation/deactivation.

BRIEF SUMMARY OF THE INVENTION

In a first aspect of the present invention, a self-checkout/check-in and EAS system is provided. For theft deterrence, an EAS tag is connected to an article. In a preferred embodiment, the article is a videocassette, but can be nearly any article in which theft deterrence and self-checkout/check-in are desired. The EAS tag interacts with an EAS interrogation zone that is typically disposed in a location suitable for theft deterrence, such as near the exits of a business establishment. The interrogation zone consists of an electromagnetic field formed by transmission from an EAS transmitter and antenna. An EAS receiver and receive antenna responsive to the interaction of the EAS tag detects an active EAS tag within the interrogation zone. For self-checkout and self-check-in the EAS tag is activatable and deactivatable.

An EAS activation antenna and an EAS deactivation antenna are located in suitable locations for check-in and checkout, respectively, of the article. The antennas are each connected to a conventional EAS transmitter or transmitters for generation of the activation and deactivation electromagnetic fields respectively. Alternately, one antenna can be utilized for both activation and deactivation.

An RFID tag is connected to the article for storage and communication of various tag data associated with the article, such as but not limited to, inventory, pricing, manufacturer authentication, purchase and return information. An RFID reader is located in a suitable location for reading the RFID tag during checkout/check-in, and derives a signal from the tag data.

RFID solves the problems associated with data capture discussed hereinabove and utilizes radio frequency (RF) interrogation and reply frequencies to capture data pertaining to articles of interest. In RFID, a tag that responds with RF identification information, in response to an RF interrogation signal, is attached, in any location, to an article to be identified. At present, RFID tags are well suited to provide article identification information, pricing information, inventory control, and can receive and store information such as the date and place of sale, sales price, and article manufacturing authenticity information. However, RFID tags are not well suited to EAS applications because of limited detection range as well as being prone to shielding and detuning when proximate certain materials, which can result in missed EAS detection. Presently EAS tags and RFID tags must both be attached to an article if identification and reliable protection of the article are desired.

A processor, responsive to the signal from the RFID reader, correlates the captured tag data with inventory data stored in an inventory database. For checkout, the processor activates the deactivation transmitter and antenna to deactivate the EAS tag, and updates the stored inventory database. A price signal for designating the price of the article for checkout can be generated. For check-in, the processor energizes the activation transmitter and antenna to activate the EAS tag, and updates the stored inventory database for check-in of the article. A separate RFID reader can be utilized for checkout and check-in of articles, and the RFID readers can be separated in location for convenience.

The RFID tag can include a programmable memory, which may be changed by an RFID writer, which writes to the RFID tag's programmable memory to effect changes therein. RFID readers can have bi-directional communication and can be used to write to the RFID tag. Alternately, a separate RFID writer can be used for writing to the RFID tag.

To solve the problem of degrading magnetic media when activating or deactivating the EAS label, an EAS label made of a special low energy magnetic material can be utilized that is activated and deactivated at relatively lower field levels. U.S. Pat. No. 5,729,200 to Copeland et al., the disclosure of which is incorporated herein by reference, discloses an EAS label material that is activated and deactivated at field levels lower than other conventional EAS label types. The disclosed tag is a magnetomechanical EAS tag, which employs an active magnetostrictive element, and a biasing element, which is a magnet that provides a biasing magnetic field. The EAS tag is a low energy tag because the material used for the biasing element is magnetized and demagnetized at low field levels. The EAS label material disclosed in the '200 reference can be activated and deactivated at field levels below that which can detectably degrade pre-recorded magnetic media.

In a second aspect of the invention, a housing is provided with a cavity to receive a plurality of articles for checkout. A deactivation antenna is located adjacent or around at least a portion of the housing so that the deactivation electromagnetic field is located within the cavity for deactivation of EAS tags attached to the articles. An RFID reader is also positioned in the housing adjacent the cavity so that RFID tags attached to the articles can be read. Once the RFID tags are read, a display can be utilized to indicate information about the articles. The information could be title and price for videocassettes, or other information relevant to the particular article.

A verification can be performed on whether the user attempting the transaction is authorized. Authorization can be accomplished, for example, by reading a magnetic strip on a membership card. Next, a method of payment must be verified such as by reading a magnetic strip on a credit card and verifying account information. Alternately, authorization for a transaction can be granted to any user that can verify payment. Thus, for example, no membership card need be utilized and only a credit card would be necessary. In another embodiment, a membership card could be prepaid or utilized to direct a billing statement such that no credit card would be needed at checkout.

Once the user and/or transactions are verified, a stored inventory database is updated with the checkout information, and the deactivation transmitter/antenna is energized to deactivate the EAS labels connected to the articles. A message can be flashed on a display reminding the user to remove all articles, and any membership or credit cards utilized. A plurality of articles can be placed into the cavity simultaneously. The RFID tags can be read simultaneously, and the EAS tags can be deactivated simultaneously.

As fully explained herein, the deactivation electromagnetic field is maintained below a maximum field strength, so when the articles contain magnetic media, such as videotape, pre-recorded video information will not be detectably degraded. The field is maintained above a minimum field strength so the EAS tags will be fully deactivated. EAS tags are connected to videocassettes in a known orientation. The housing is sized such that the videocassettes are inserted narrow end first so the orientation of the EAS tag within the electromagnetic field is known to facilitate deactivation. The orientation of the EAS tag is such that the length of the EAS tag is oriented axially within the deactivation field. Thus, the cassette can be rotated on axis a full 360° within the deactivation field and the EAS tag will be deactivated but pre-recorded magnetic media will not be degraded.

In a third aspect of the present invention, the housing is adapted to receive a plurality of articles for check-in. An activation antenna is located adjacent or around at least a portion of the housing so that the deactivation electromagnetic field is located within the housing for activation of EAS tags attached to the articles. An RFID reader is also positioned adjacent the housing so that RFID tags attached to the articles can be read.

In a preferred embodiment the housing is elongated with an entrance aperture at one end for receiving the articles. The housing is positioned such that the articles placed into the entrance aperture drop through the housing and out of an exit aperture located at the end opposite the entrance aperture. The RFID reader is preferably located near the entrance aperture, and the EAS activation antenna is preferably located between the RFID reader and the exit aperture. A container can be provided at the exit aperture to collect the articles that pass through the housing.

Once an article is placed into the entrance aperture, the RFID tag is read, and the activation transmitter and antenna are energized to activate the EAS tag. The store's inventory database is updated, and information about the article can be displayed.

A separate sensor can be used to sense articles as they enter the housing, and a sensor counter can be incremented for each article deposited into the housing. If an article is deposited into the check-in housing without a valid RFID read, an error message can be generated. A valid RFID read can increment an RFID counter which can be compared to the sensor counter.

As fully explained herein, for articles containing magnetic media such as videocassettes, the activation electromagnetic field is maintained below a maximum level safe for magnetic media, but high enough to activate the EAS tags. The EAS tags are connected to the videocassette in a known orientation relative to the cassette. The entrance aperture to the housing is sized such that the videocassettes must be deposited narrow end first. Therefore, the EAS tags pass through the activation electromagnetic field in a known orientation to facilitate activation. The orientation of the EAS tag is such that the length of the EAS tag is oriented axially within the activation field. Thus, the cassette can be rotated a full 360° on axis within the activation field and the EAS tag will be activated but pre-recorded magnetic media will not be degraded. A plurality of RFID tags can be read simultaneously and a plurality of EAS tags can be activated simultaneously.

For self-check-in operation, the user simply drops the videocassettes into the housing aperture. The videocassettes fall through the housing into a container at the exit end of the housing. As the cassettes pass through the housing, the RFID tags are read, the EAS tags are activated, and the store's inventory database is updated. Furthermore, a display can be used to display information on the returned items, as well as display error messages if needed. The error messages can alert store personnel to articles that have been deposited into the housing, but did not have a valid RFID read for whatever reason. The store personnel can correlate the actual returned articles with the indicated returned articles to identify the article that may have, for example, been returned to the wrong store.

Accordingly it is an object of the present invention to provide a self-checkout/check-in and EAS system that can process one or more articles simultaneously.

It is another object of the present invention to provide a self-checkout/check-in and EAS system that activates and deactivates EAS tags without detectably degrading magnetic media.

It is still another object of the present invention to provide a self-checkout and EAS apparatus that reads a plurality of RFID tags simultaneously, deactivates a plurality of EAS tags simultaneously without detectably degrading magnetic media, and updates a stored inventory database.

It is a further object of the present invention to provide a self-check-in and EAS apparatus that reads a plurality of RFID tags simultaneously, activates a plurality of EAS tags simultaneously without detectably degrading magnetic media, and updates a stored inventory database.

Other objectives, advantages, and applications of the present invention will be made apparent by the following detailed description of the preferred embodiment of the invention.

BRIEF DESCRIPTION OF THE SEVERAL VIEWS OF THE DRAWINGS

FIG. 9 is a preferred embodiment of the present invention for self-check-in.

DETAILED DESCRIPTION OF THE INVENTION

Figure 1:
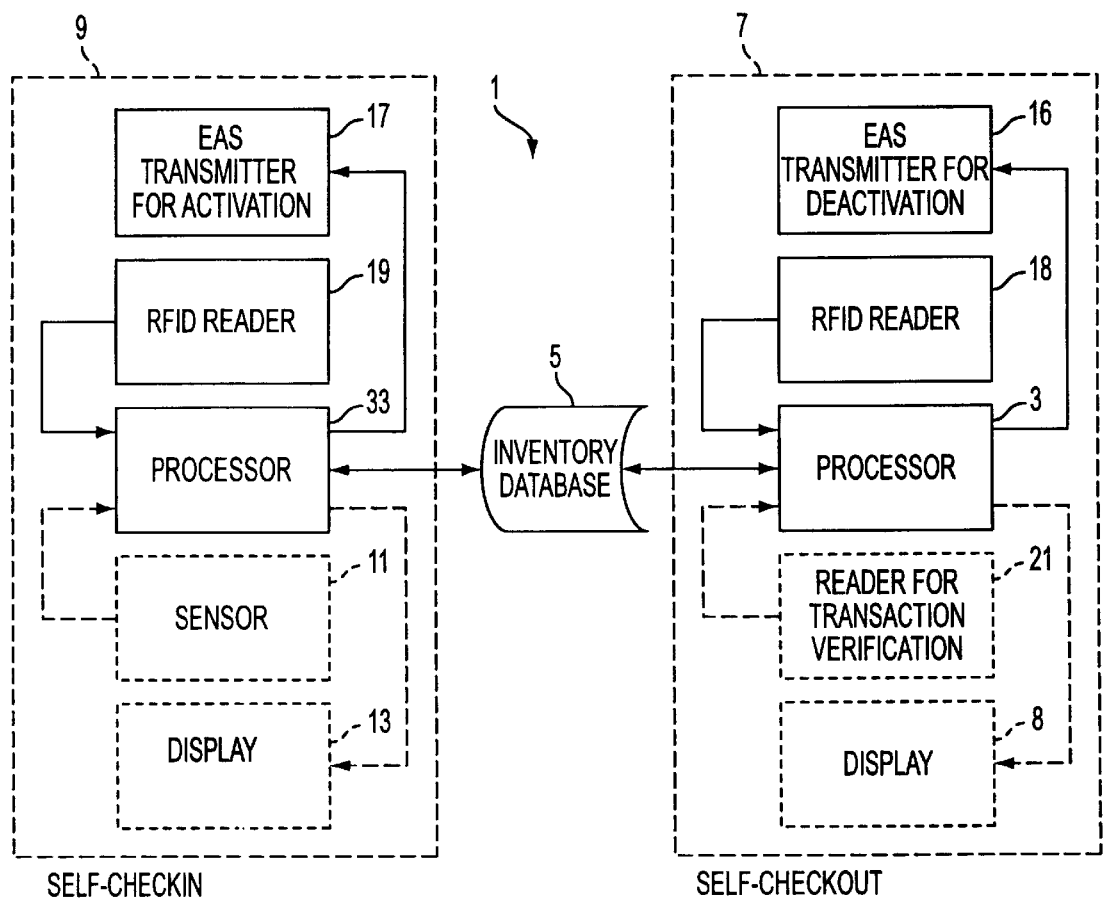
FIG. 1 is a block diagram of one embodiment of the present invention.

Referring to FIG. 1, one embodiment of the present invention is illustrated generally at 1, and includes inventory database 5, checkout subsystem 7, and check-in subsystem 9. Inventory database 5 stores conventional asset and/or inventory tracking data. Checkout subsystem 7 includes processor 3, RFID reader 18, antenna 16 including a suitable transmitter for EAS deactivation, and can include display 8 and transaction verification reader 21, which can be a magnetic card reader or equivalent. Check-in subsystem 9 includes processor 33, RFID reader 19, antenna 17 including a suitable transmitter for EAS activation, sensor 11 for detection of returned articles, and can include display 13.

In an alternate embodiment, antenna 16 can also include a suitable transmitter for activation in which case checkout subsystem 7 along with inventory database 5 can perform both checkout and check-in operations. In this embodiment, check-in subsystem 9 would not be needed. Alternately, antenna 17 can include a suitable transmitter for deactivation in which case check-in subsystem 9 along with inventory database 5 can perform both checkout and check-in operations. In this embodiment, checkout subsystem 7 would not be needed. Details and operation of the above will become apparent by the following discussion of the preferred embodiment of the present invention.

Figure 2:
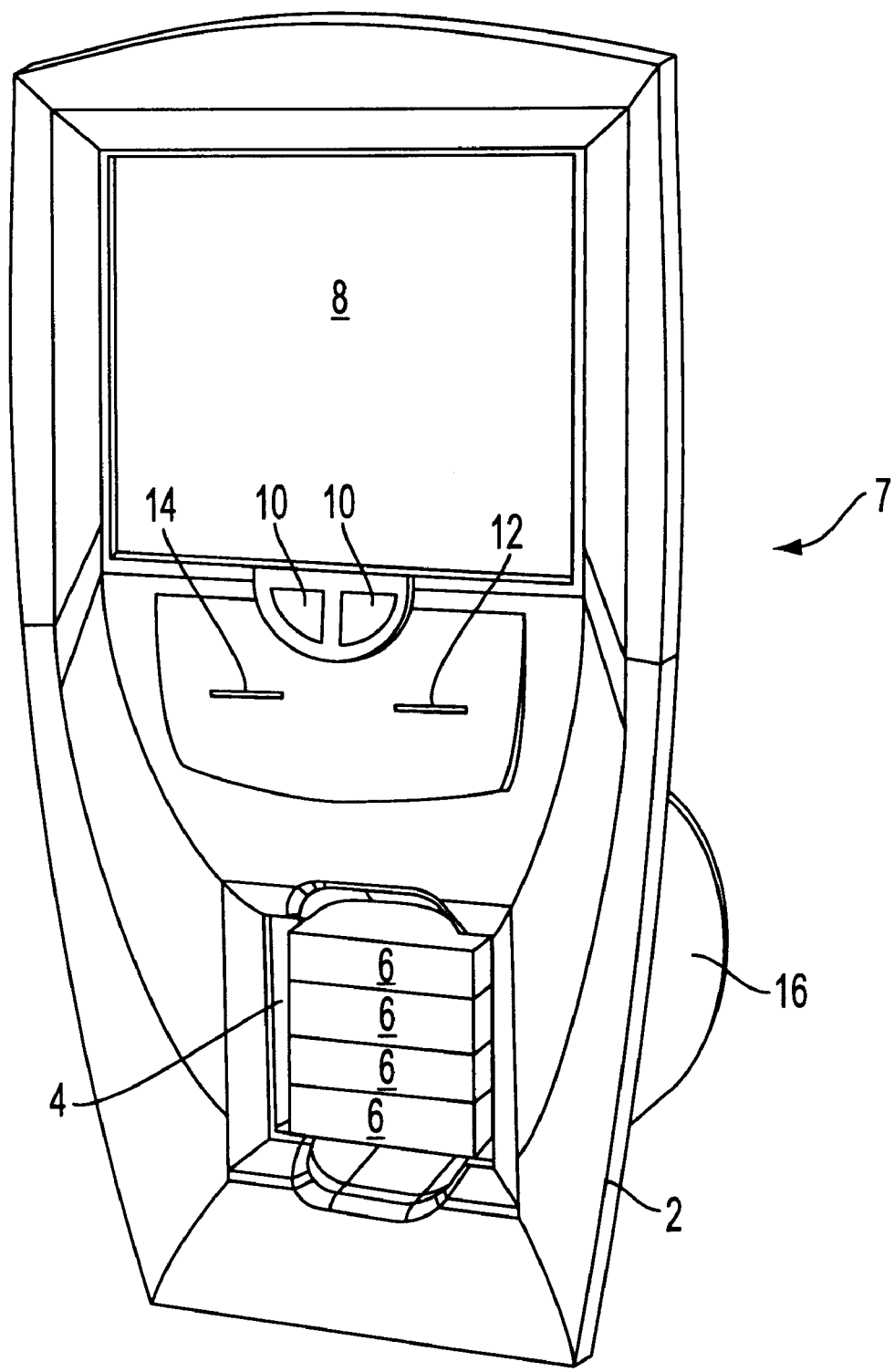
FIG. 2 is a front perspective view of the preferred embodiment of the present invention.

Referring to FIG. 2, a preferred embodiment of the checkout subsystem 7 is illustrated including housing 2 having cavity 4 for receiving a plurality of articles 6. In the preferred embodiment, articles 6 are videocassettes, but can be nearly any other articles useable in the self-checkout/ check-in system of the present invention. Housing 2 and cavity 4 would be conformed to the particular article, such as books or other merchandise. The checkout subsystem 7 may also include display 8, user operable pushbuttons 10. For transaction verification 21, a slot 12 can be provided for insertion and reading of membership identity cards, credit cards, and the like. Slot 14 can be used for dispensing user transaction written receipts.

Figure 3:
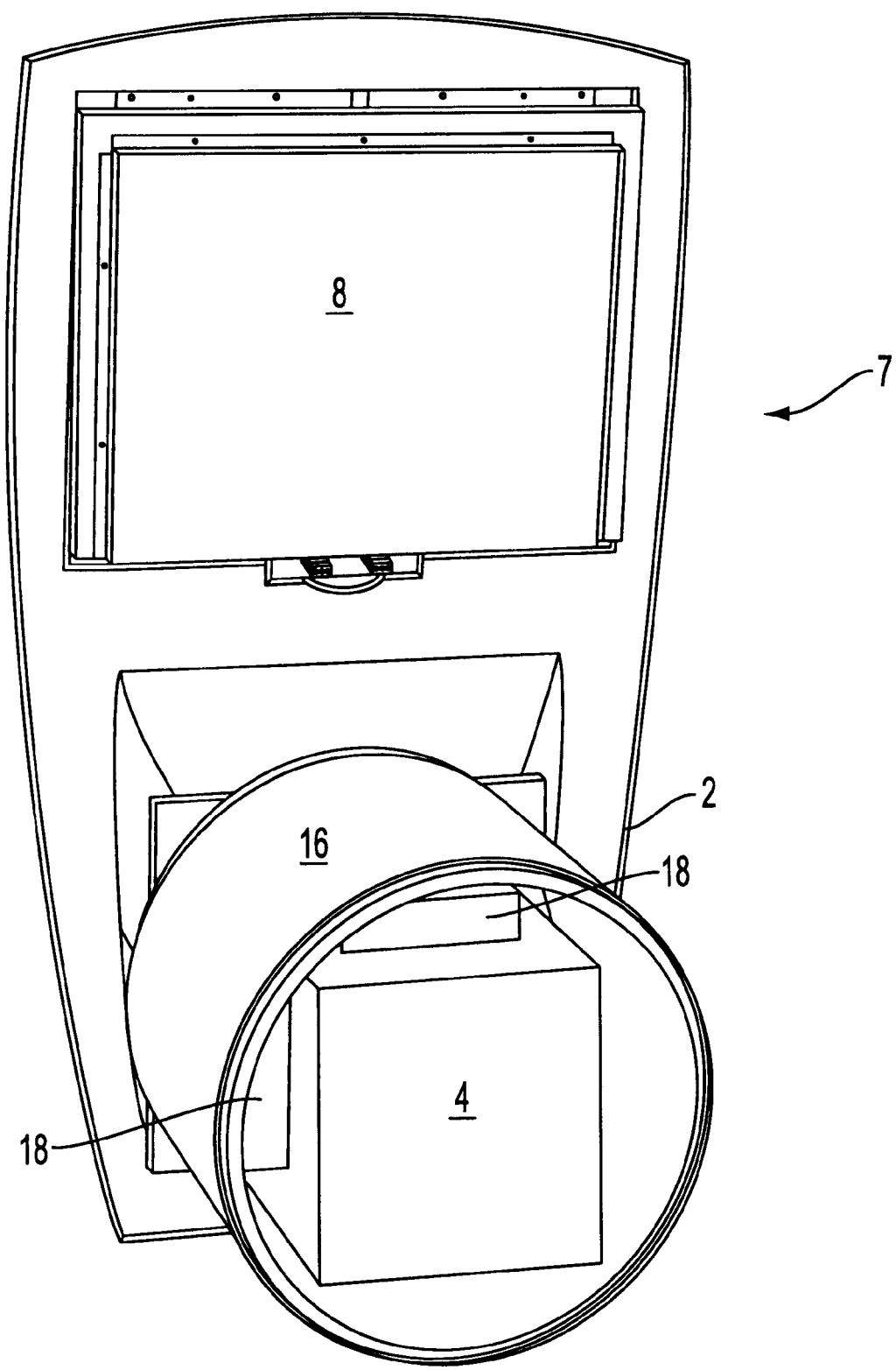
FIG. 3 is a rear perspective view of the embodiment of FIG. 2.

Referring to FIG. 3, EAS deactivation antenna 16 and a pair of RFID readers 18 is illustrated. The self-checkout subsystem 7 is primarily intended for self-checkout, but, as fully explained below, deactivation antenna 16 can also be used to activate EAS tags, so that self-check-in is also possible using the embodiment as illustrated at 7.

Figure 4:
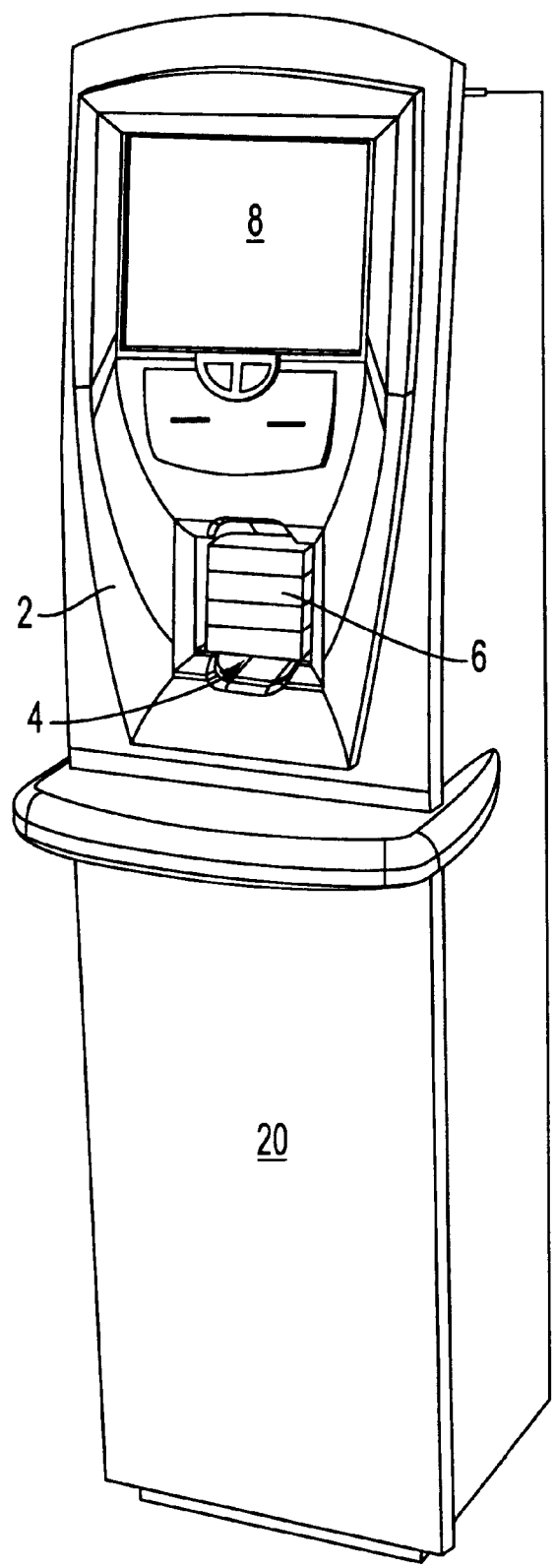
FIG. 4 is a front perspective view of the embodiment of FIG. 2 including a freestanding enclosure.
Figure 5:
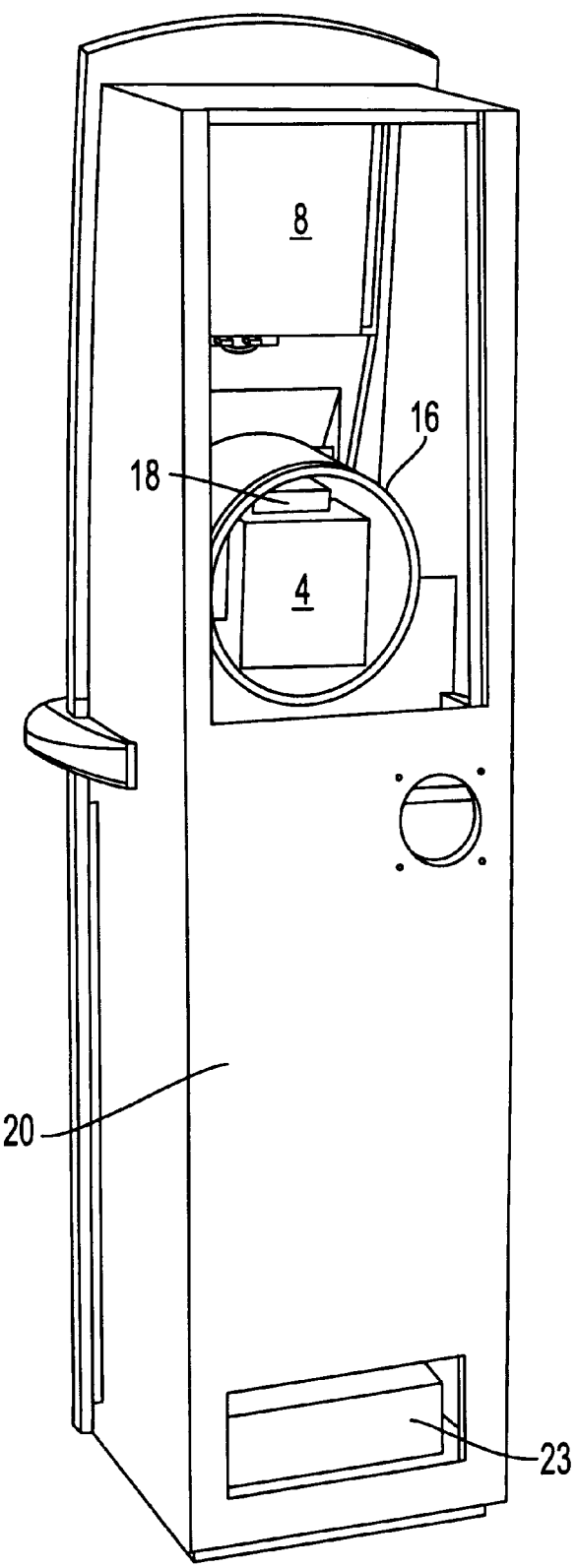
FIG. 5 is a rear perspective view of the embodiment of FIG. 2 including a freestanding enclosure.

FIGS. 4 and 5 illustrate the self-checkout subsystem 7 of the present invention disposed in a freestanding enclosure 20. Enclosure 20 can house an EAS deactivation/activation transmitter or transmitters, a processor 3, RFID reader/writer electronics, and other electronics and power distribution circuitry (not individually illustrated but jointly represented at 23). Alternately, self-checkout subsystem 7 may be located within a wall or other location (not shown).

Figure 6:
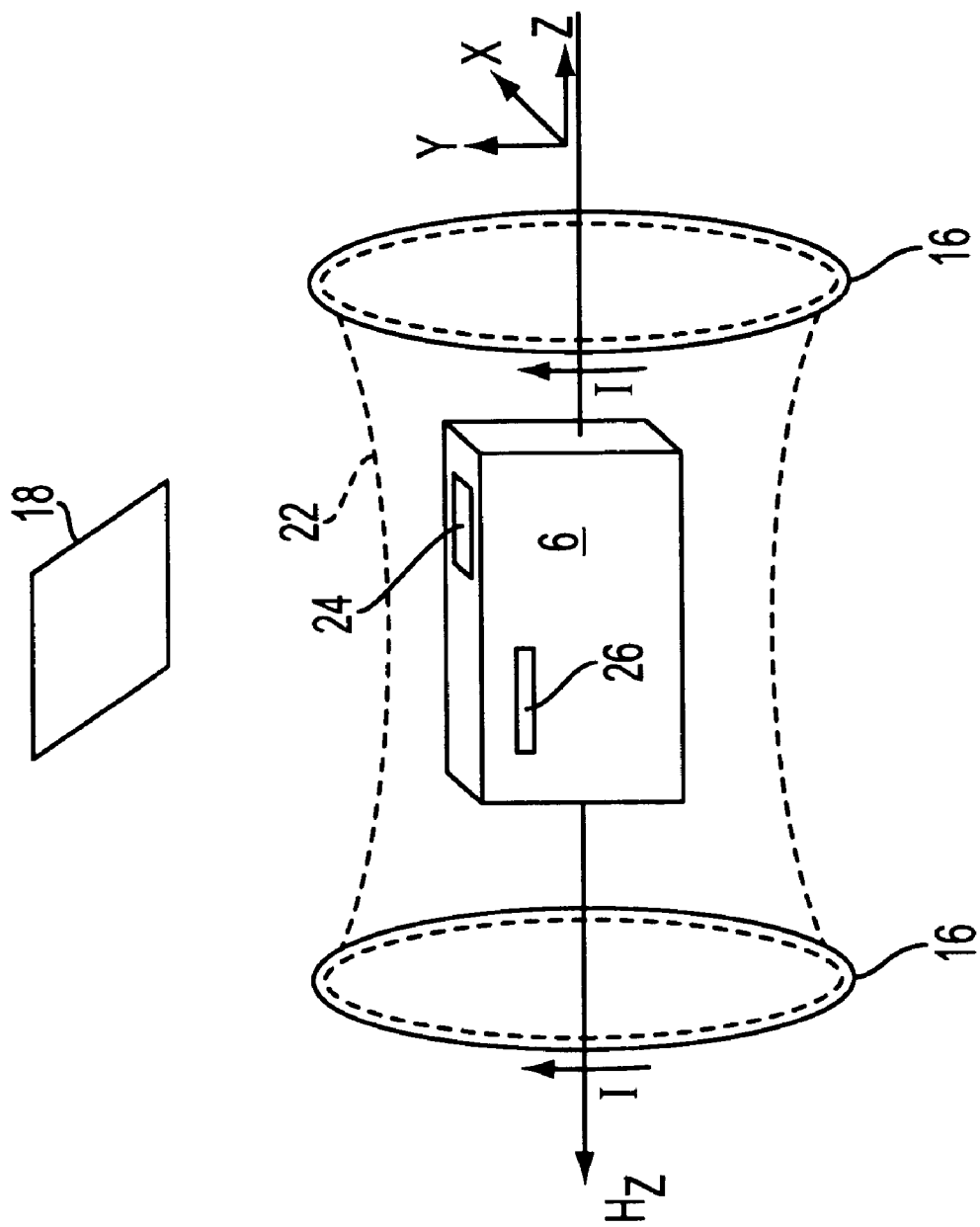
FIG. 6 is a diagram of the deactivation zone and RFID read zone for the embodiment of FIG. 2.

FIG. 6 illustrates the deactivation zone 22 disposed within cavity 4. EAS tag 24, and RFID tag 26 are illustrated on videocassette 6. RFID tag 26 can be disposed in any orientation and at any location on cassette 6 and RFID reader antenna can read the RFID tag. EAS tag 24 will always be positioned on cassette 6 such that the EAS tag will be positioned with the tag length axially oriented within the deactivation magnetic field within deactivation zone 22, as illustrated in FIG. 6. This is accomplished by properly orienting EAS tag 24 onto cassette 6 as illustrated in FIG. 6, and by sizing cavity 4 such that cassette 6 must always be inserted narrow end first as best shown in FIG. 2.

EAS tag 24 is a low energy magnetomechanical tag as disclosed in U.S. Pat. No. 5,729,200, the disclosure of which is incorporated herein by reference. A magnetomechanical EAS tag employs an active magnetostrictive element, and a biasing element, which is a magnet that provides a biasing magnetic field. The EAS tag is a low energy tag because the material used for the biasing element is magnetized and demagnetized at low field levels. As disclosed in the '200 patent, a peak AC field level of at least 25 Oersted (Oe) along the label length everywhere in the deactivation zone is required for deactivation. An AC pulse having a decaying signal envelope commonly known as "ringdown" forms the deactivation electromagnetic field. A peak field level of 25 Oe is the field level required for deactivation when the magnetic field is oriented along the length of the biasing element as disclosed in the '200 patent. The EAS tag can be properly oriented within the magnetic field generated within the deactivation zone when placed in a known orientation on the cassette, and then controlling the orientation of the cassette within cavity 4. Cassette 6 can be rotated 360 degrees as long as EAS tag 24 is oriented with the tag length axially positioned within the magnetic field. If the EAS tag is oriented in a random manner, the magnetic field will need to be adjusted to a higher level to deactivate the EAS tag. However, a higher field level may degrade prerecorded magnetic media.

Figure 7:
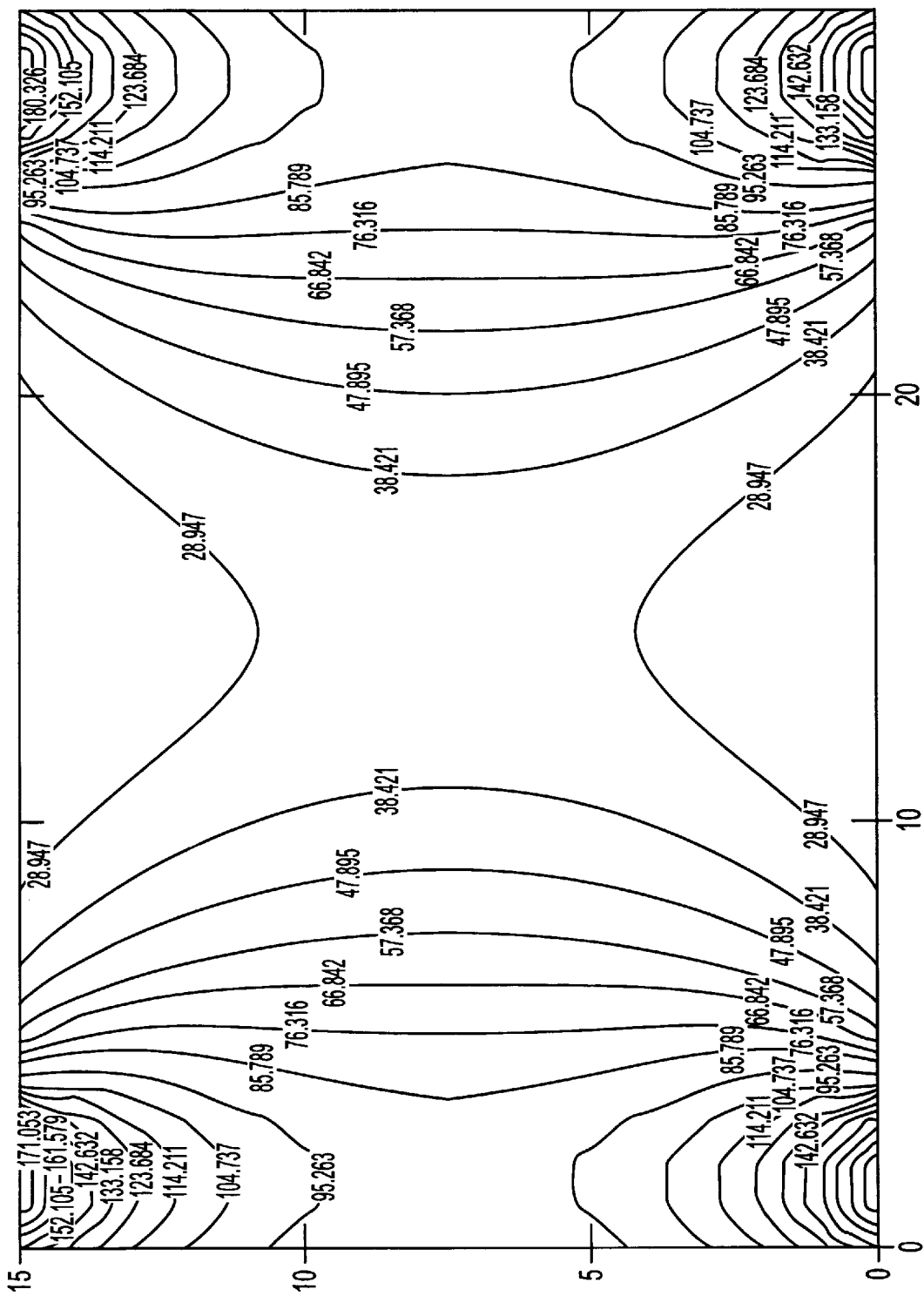
FIG. 7 is a plot of the peak magnetic field generated within the deactivation zone of the present invention.

Referring to FIG. 7, a two dimensional plot of the peak magnetic field generated within deactivation zone 22 is illustrated. In this embodiment, deactivation antenna 16 is comprised of two circular coils of 16 cm diameter, represented by the vertical axis, and separated by 30 cm, represented by the horizontal axis. The maximum field level for all magnetic recording media to be safe, or not detectably degraded, is 125 Oe throughout the deactivation zone, and 200 Oe for videotape. As can be seen in FIG. 7, the peak magnetic field levels do not exceed 200 Oe within the deactivation zone, and only exceed 125 Oe very near the antenna coils. However, everywhere in the deactivation zone, the peak level is greater than 25 Oe, which is the level required for deactivation of the low energy EAS label. Therefore, a low energy EAS label will be deactivated anywhere within cavity 4, but videotape recording media will not be harmed. For the more stringent 125 Oe peak level for other magnetic recording media such as type 1 audio tape, the cavity 4 can be adjusted in size such that the deactivation zone does not include peak field levels exceeding 125 Oe, making the deactivation zone 22 safe for all magnetic recording media.

Figure 8:
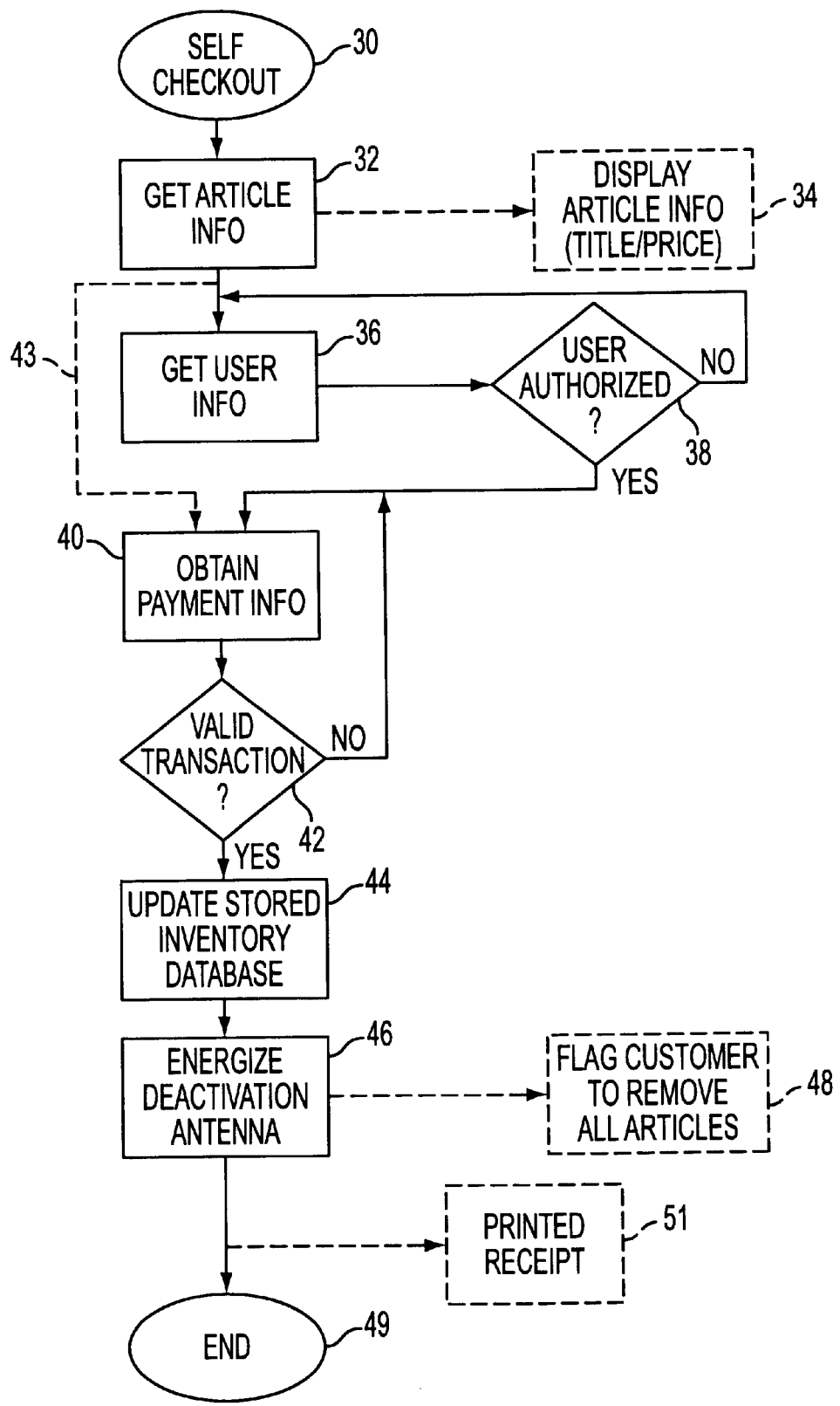
FIG. 8 is a flow chart of the self-checkout process.

Referring to FIG. 8, operation of self-checkout subsystem 7 is illustrated. For self-checkout 30, the user places one or more videocassette 6 choices into cavity 4 in housing 2. The RFID reader 18 reads the RFID tag or tags 26 connected to each videocassette 6 to retrieve the information pertaining to each individual article 32. The information can be nearly any pertinent information about the article, including manufacturing data such as date and/or authentication or idem identification information, and in the case of videocassettes 6 it can simply be the title and price. The retrieved information can be displayed 34 on display 8 if desired.

User information can be collected 36 such as by reading a user membership card and checking account information to verify that the user is authorized 38. A card reader 21 can be utilized and accessed through slot 12, shown in FIG. 2. If the user is authorized, payment information is obtained 40. Reading a credit card, through slot 12, and verifying account information to confirm that the transaction is valid 42 can accomplish obtaining payment information. Alternately, a user may be authorized for the transaction by direct verification of payment 43, by either using a credit card, debit card, or a prepaid membership card. During the verification process, the user can be asked various questions at various stages during the transaction. The user can respond to the queries by depressing push buttons 10 on housing 2. For example, prior to completing the transaction, the user may be asked to confirm the purchase intention.

After verification that the transaction is valid 42, the store's inventory database 5 is updated 44. The stored inventory database 5 can include stored inventory data consisting of nearly any type of relevant data about the article. The EAS deactivation antenna 16 and associated transmitter is energized 46 to deactivate all of the EAS tags 24 within cavity 4. A message can be flashed 48 on display 8 reminding the user to remove all articles and cards to end the checkout process 49. If desired, a printed receipt 51 of the transaction can be obtained at slot 14.

The embodiment of the invention as illustrated in FIG. 2, can also be used to perform the check-in process, activate the EAS labels and update the inventory database 5. Antenna 16 can be used for activation, or a separate antenna can be utilized within housing 2 for activation (not shown).

Figure 9:
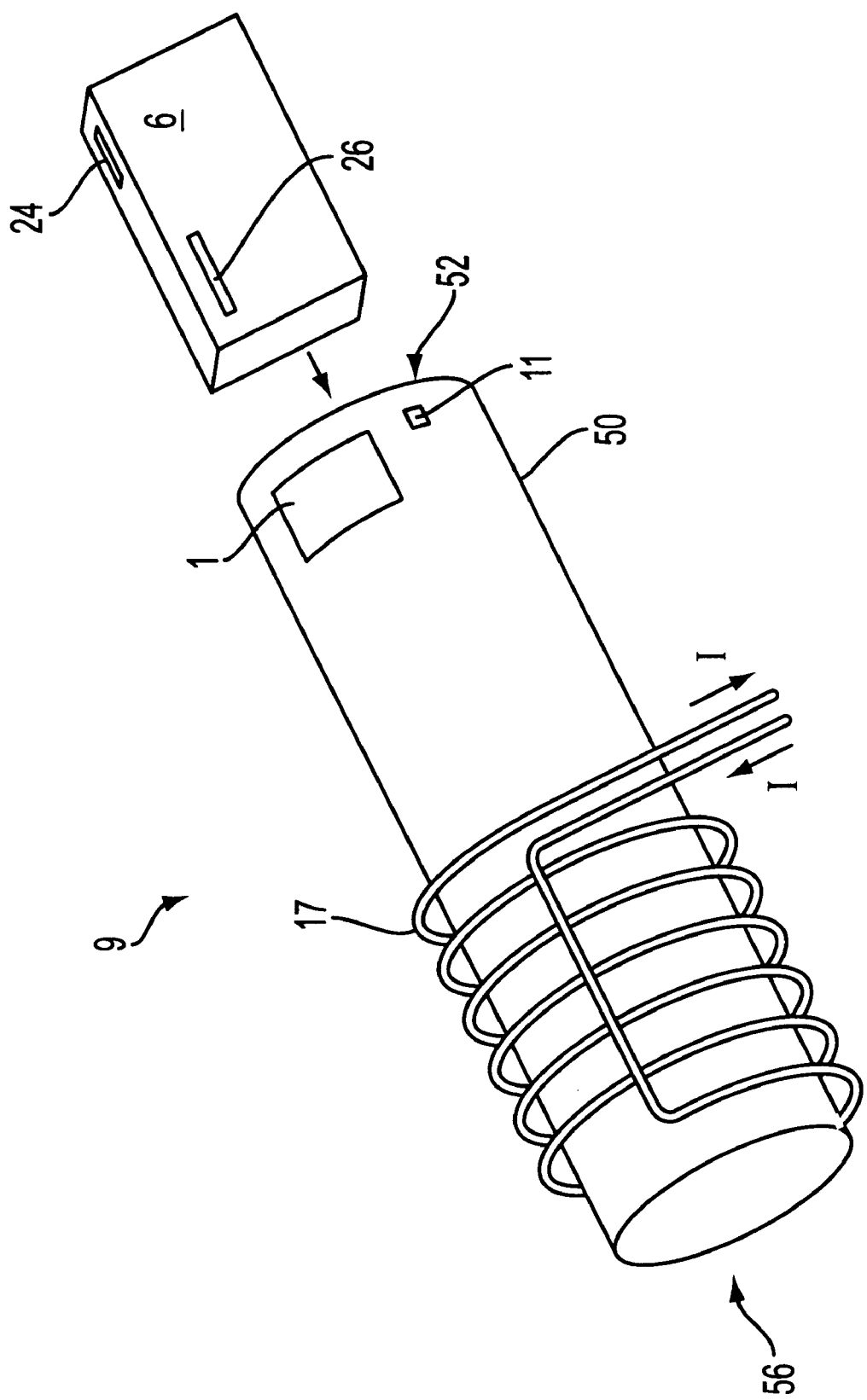

Referring to FIG. 9, for self-check-in, the preferred embodiment of the self-check-in subsystem 9 of the present invention is illustrated including elongated housing 50. Housing 50 is sized to make certain that one or more videocassettes 6 are inserted narrow end first through the entrance aperture 52, which ensures that EAS tag 24 is oriented with the tag length in an axial direction with regard to the activation magnetic field formed within housing 50 by EAS activation antenna 17. Housing 50 is positioned such that videocassettes 6 are deposited through entrance aperture 52, drop through housing 50, and out through exit aperture 56. RFID reader 19, which can be identical to the RFID reader 18 illustrated in FIGS. 3 and 6, is located near entrance aperture 52 for reading RFID tags 26. A separate sensor 11, which can be a photo sensor, can be utilized to sense each videocassette 6 passing through housing 50, and can be used to increment a counter (not shown).

EAS activation antenna 17, along with an associated transmitter, forms an activation magnetic field within housing 50 to activate the low energy EAS labels 24. As disclosed in the '200 patent, a magnetic field level of at least 100 Oe along the entire label length everywhere in the activation zone is required for activation of the label. As stated hereinabove, the maximum peak magnetic field level that is safe for magnetic recording media is 125 Oe. A field level of 100 Oe is the field level required for activation when the magnetic field is oriented along the length of the biasing element as disclosed in the '200 patent. The EAS tag can be properly oriented within the magnetic field generated within the activation zone when placed in a known orientation on the cassette, and then controlling the orientation of the cassette within housing 50. If the EAS tag is oriented in a random manner, the magnetic field will need to be adjusted to a higher level to activate the EAS tag. However, a higher field level may degrade prerecorded magnetic media.

Figure 10:
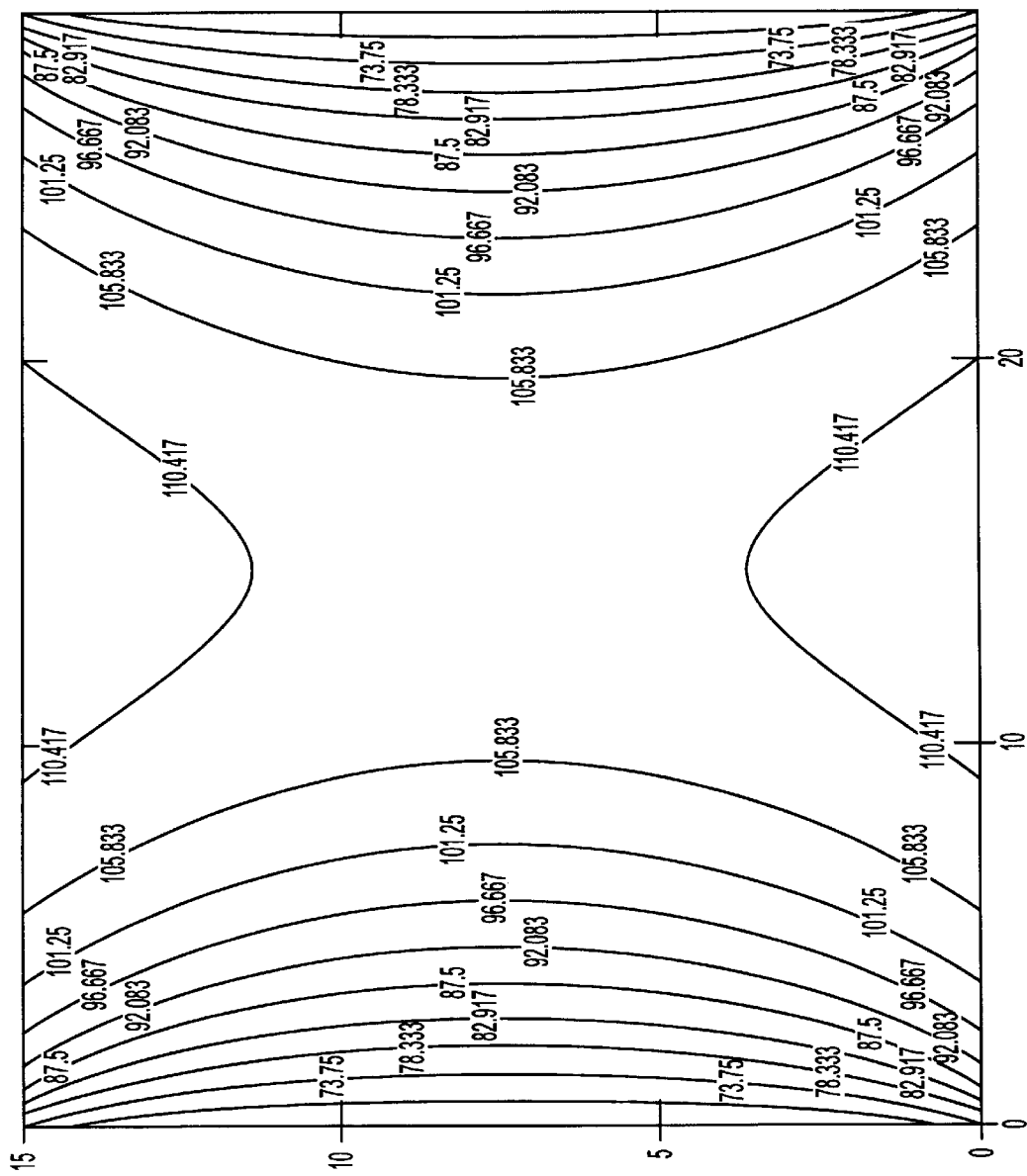
FIG. 10 is a plot of the peak magnetic field generated within the activation zone of the present invention.

Referring to FIG. 10, the activation peak magnetic field level within housing 50 is illustrated for a solenoid activation coil with a 16-cm diameter, represented by the vertical axis, and a 30-cm separation, represented by the horizontal axis. As illustrated, the peak magnetic field is greater than 100 Oe, but does not exceed 125 Oe everywhere within the activation zone. A low energy EAS label will be activated anywhere within the activation zone, but magnetic recording media will not be detectably degraded.

Figure 11:
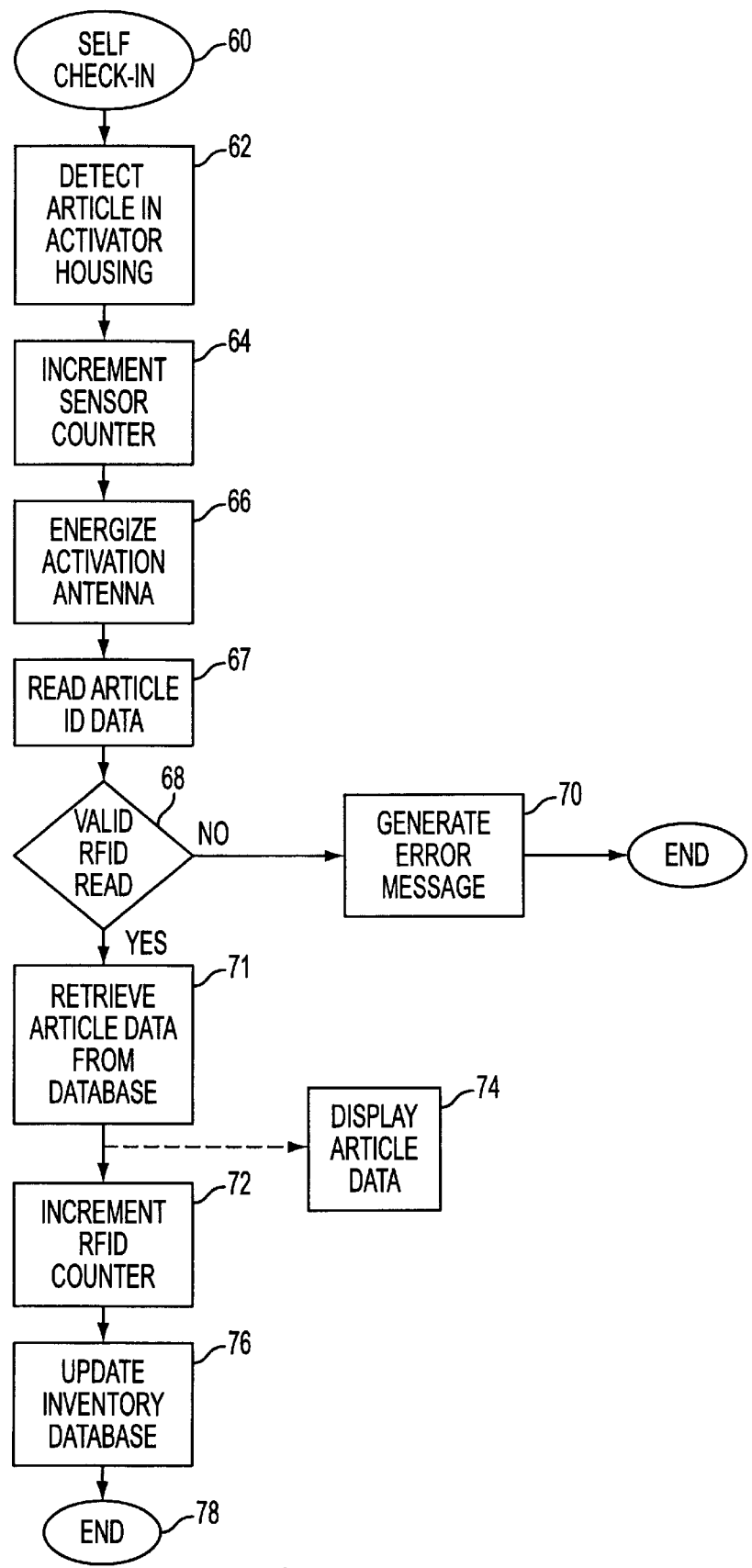
FIG. 11 is a flow chart of the self-check-in process.

Referring to FIG. 11, operation of self-check-in subsystem 9 is illustrated. For self-check-in 60, the user deposits one or more videocassettes 6 into entrance aperture 52 of housing 50. Sensor 11 can be used to detect 62 each videocassette 6 as it enters housing 50, and can increment a counter 64. Activation antenna 17 is energized 66 to activate EAS tag 24. Article identification data from RFID tag 26 is read 67. Verification that RFID tag 26 is read by RFID reader 19 is performed 68. Verification can be accomplished by checking that each increment of counter 64 is accompanied by an RFID read. If the RFID tag 26 was not read an error message can be generated 70. For example, if someone returns a videocassette from another store, the RFID tag 26 may not be present, and no RFID read will occur.

If the RFID tag 26 is correctly read, article inventory data can be retrieved from the inventory database 71, an RFID counter is incremented 72 for comparison to the sensor counter, and data concerning the returned articles can be displayed 74. The store's inventory database 5 is then updated 76 with the returned article data to end the self-check-in process 78.

At the exit aperture 56, a container (not shown) can be placed to catch the videocassettes 6 as they pass through housing 50. An employee of the video store can collect the videocassettes for return to the store's shelves. The employee can verify that all the videocassettes 6 have been properly read by noting any error messages generated, and by comparing the number of cassettes returned to the number indicated on the sensor counter. All of the EAS tags 24 connected to the videocassettes 6 will have been activated, so an attempt to remove any of the returned videocassettes 6 will trigger an alarm per conventional EAS sensors suitably positioned at the exits of the store.

The embodiment of the present invention illustrated in FIG. 2, which is the preferred embodiment as described above for self-checkout, can be used for activation, and hence self-check-in. For self-check-in, the activation zone must include a magnetic field distribution as illustrated in FIG. 10, or an equivalent field that can activate low energy EAS tags without detectably degrading prerecorded magnetic media.

In addition, the preferred embodiment of the present invention as described above for self-check-in, illustrated in FIG. 9, can be used for deactivation, and hence self-checkout. For self-checkout, the deactivation zone must include a magnetic field distribution as illustrated in FIG. 7, or an equivalent field that can deactivate low energy EAS tags without detectably degrading prerecorded magnetic media. If the articles to be used with the present invention system do not contain magnetic media, then restriction of the activation and deactivation magnetic field to below 125 Oe, or 200 Oe for videotape, is not required.

In the embodiments described above, RFID tags 26 can include programmable memory, and RFID readers 18 and 19 can also write to the RFID tag 26 and be used to reprogram the RFID tag memory. Thus, data can be updated within each RFID tag, which can be read at the next checkout or check-in.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. A system for self-check-in of an article and activation of an electronic article surveillance (EAS) tag, comprising:

an activatable EAS tag associated with the for theft deterrence;

an RFID tag associated with the article for storage and communication of tag data associated with the article;

a housing having an aperture adapted to receive the article in a preselected orientation;

means for activation of said EAS tag;

an RFID reader adjacent said housing for reading said RFID tag and deriving a signal from said tag data;

an inventory database containing inventory data associated with the article;

a processor responsive to said signal from said RFID reader for retrieving said inventory data from said inventory database, said processor triggering said means for activaton to activate said EAS tag, and updating said inventory data in said inventory database for check-in of the article; and, means connected to said housing for sensing the articles within said housing, said processor being responsive to said means for sensing to count the number of articles received into said housing.

2. The system as recited in claim 1 wherein said means for activation of said EAS tag comprises a transmitter and an EAS activation antenna, said antenna disposed adjacent said housing and being responsive to said transmitter for generating an activation electromagnetic field within said housing when triggered for activation of said EAS tag, said processor triggering said transmitter when said article is deposited through said aperture into said housing.

3. The system as recited in claim 2 wherein said antenna is a coil disposed around at least a portion of said housing, said EAS tag having a length oriented axially within said coil when said EAS tag is disposed on the article and the article is disposed within said housing.

4. The system as recited in claim 3 wherein said activation electromagnetic field is a DC field with a maximum field level that is less than a level that detectably degrades prerecorded magnetic media.

5. The system as recited in claim 4 wherein said activation electromagnetic field level is between about 100 Oe and about 200 Oe within said housing.

6. The system as recited in claim 5 wherein said activation electromagnetic field level is between about 100 Oe and about 125 Oe within said housing.

7. The system as recited in claim 1 further comprising means for deactivation of said EAS tag.

8. The system as recited in claim 1 further comprising means for writing to said RFID tag for updating said tag data associated with the article, said means for writing adjacent said housing and being responsive to said processor.

9. A system for self-check-in of an article and activation of an electronic article surveillance (EAS) tag, comprising:
an activatable EAS tag associated with the for theft deterrence;
an RFID tag associated with the article for storage and communication of tag data associated with the article;
a housing having an aperture adapted to receive a plurality of the articles in a preselected orientation;
means for activation of said EAS tag;
an REFID reader adjacent said housing for reading said RFID tag and deriving a signal from said tag data;
an inventory database containing inventory data associated with the article;
a processor responsive to said signal from said RFID reader for retrieving said inventory data from said inventory database, said processor triggering said means for activation to activate said EAS tag, and updating said inventory data in said inventory database for check-in of the article; and,
means connected to said processor for sensing each article placed into said housing for confirming an RFID tag is read for each article, said processor generating an error signal for articles sensed without associated RFID tag data.

10. The system as recited in claim 9 further comprising means for deactivation of said EAS tags.

11. The system as recited in claim 9 further comprising means for writing to said RFID tag for updating said tag data associated with each of the articles, said means for writing adjacent said housing and being responsive to said processor.

12. An apparatus for self-check-in of an article and activation of an electronic article surveillance (EAS) tag, comprising:
an activatable EAS tag associated with the article, in a preselected orientation, for theft deterrence;
an RFID tag associated with the article for storage and communication of tag data associated with the article;
an elongated housing having an aperture at a first end adapted to receive the article in a preselected orientation, said housing being disposed so that articles placed through said aperture at said first end pass through said elongated housing and exit said housing at a second end;
means for activation of said EAS tag, said means for activation including a transmitter and an EAS activation coil, said coil disposed around at least a portion of said elongated housing adjacent and responsive to said transmitter for generating an activation electromagnetic field within said elongated housing when triggered for activation of said EAS tag, said EAS tag having a length positioned on said article to pass through said activation coil in an axial orientation when said article passes through said elongated housing;
an RFID reader disposed on said elongated housing adjacent said first end for reading said RFID tag and deriving a signal from said tag data;
an inventory database containing inventory data associated with the article; and,
a processor responsive to said signal from said RFID reader for retrieving said inventory data from said inventory database, said processor triggering said transmitter to generate said activation electromagnetic field to activate said EAS tag when said article is deposited through said aperture, and updating said inventory data in said inventory database for check-in of the article.

13. The apparatus as recited in claim 12 further comprising means for writing to said RFID tag disposed adjacent said first end of said elongated housing and being responsive to said processor for updating said tag data associated with the article.

14. The apparatus as recited in claim 12 wherein said activation electromagnetic field is a DC field with a maximum field level that is less than a level that detectably degrades prerecorded magnetic media.

15. The apparatus as recited in claim 14 wherein said activation electromagnetic field level is between about 100 Oe and about 200 Oe within said housing.

16. The apparatus as recited in claim 15 wherein said activation electromagnetic field level is between about 100 Oe and about 125 Oe within said housing.

17. The apparatus as recited in claim 12 further comprising means for deactivation of said EAS tag.

18. A system for self-checkout of an article and deactivation of an electronic article surveillance (EAS) tag, comprising:
a deactivatable EAS tag associated with the article for theft deterrence;
an RFID tag associated with the article for storage and communication of tag data associated with the article;
a housing having a cavity adapted to simultaneously receive a plurality of the articles in a preselected orientation;
means adjacent said cavity for deactivation of said EAS tag;
RFID reader adjacent said cavity for reading said RFID tag and deriving a signal from said data;
an inventory database containing inventory data associated with the article; and,
a processor responsive to said signal from said RFID reader for retrieving said inventory data from said inventory database, said processor trigger said means for deactivation to deactivate said EAS tag, and updating said inventory data in said inventory database for checkout of the article.

19. The system as recited in claim 18 wherein said means for deactivation of said EAS tag comprises a transmitter and an EAS deactivation antenna, said antenna disposed adjacent said cavity and being responsive to said transmitter for generating a deactivation electromagnetic field within said cavity when triggered for deactivation of said EAS tag.

20. The system as recited in claim 19 wherein said antenna is a coil disposed around at least a portion of said cavity, said EAS tag having a length oriented axially within said coil when said EAS tag is disposed on the article and the article is disposed within said cavity.

21. The system as recited in claim 18 further comprising means for verification of an authorized checkout, said processor being responsive to said means for verification for triggering said means for deactivating.

22. The system as recited in claim 21 wherein said means for verification of an authorized checkout includes means for reading a membership card and verifying membership.

23. The system as recited in claim 22 wherein said means for verification of an authorized checkout includes means for reading a credit card and verifying credit.

24. The system as recited in claim 18 further comprising means for writing to said RFID tag for updating said tag data associated with the article, said mean for writing disposed adjacent said housing and being responsive to said processor.

25. The system as recited in claim 20 wherein said deactivation electromagnetic field is an AC ringdown pulse with a maximum field level that is less than a level that detectably degrades prerecorded magnetic media.

26. The system as recited in claim 25 wherein said deactivation electromagnetic field level is between about 25 Oe and about 200 Oe within said cavity.

27. The system as recited in claim 26 wherein said deactivation electromagnetic field level is between about 25 Oe and about 125 Oe within said cavity.

28. The system as recited in claim 18 further comprising means for activation of said EAS tag, said means for activation being responsive to said processor.

29. The system as recited in claim 18 wherein said processor further includes means for generating a price signal for designating the price of each of the articles and a total price for checkout.

30. The system as recited in claim 29 including a display.

31. The system as recited in claim 18 further comprising means for verification of an authorized checkout, said processor being responsive to said means for verification for triggering said means for deactivating.

32. The system as recited in claim 31 wherein said means for verification of an authorized checkout includes means for reading a membership card and verifying membership.

33. The system as recited in claim 31 wherein said means for verification of an authorized checkout includes means for reading a credit card and verifying credit.

34. The system as recited in claim 18 further comprising means for writing to said RFID tag for updating said tag data associated with the article, said mean for writing disposed adjacent said housing and being responsive to said processor.

35. The system as recited in claim 18 wherein said deactivation electromagnetic field is an AC ringdown pulse with a maximum field level that is less than a level that detectably degrades prerecorded magnetic media.

36. The system as recited in claim 18 wherein said deactivation electromagnetic field level is between about 25 Oe and about 200 Oe within said cavity.

37. The system as recited in claim 36 wherein said deactivation electromagnetic field level is between about 25 Oe and about 125 Oe within said cavity.

38. The system as recited in claim 18 further comprising means for activation of said EAS tag, said means for activation being responsive to said processor.

39. An apparatus for self-checkout of an article and deactivation of an electronic article surveillance (EAS) tag, comprising:

a deactivatable EAS tag associated with the article, in a preselected orientation, for theft deterrence;

an RFID tag associated with the article for storage and communication of tag data associated with the article;

a housing having a cavity adapted to receive simultaneously a plurality of the articles in a preselected orientation;

means for deactivation of said EAS tag, said means including an antenna coil disposed around at least a portion of said cavity, said EAS tag having a length oriented axially within said coil when said EAS tag is disposed on the article within said cavity;

an RFID reader disposed adjacent said cavity for reading said RFID tag and deriving a signal from said tag data;

means connected to said housing for transaction verification;

means for display of at least a portion of said data;

an inventory database containing inventory data associated with the article; and, a processor responsive to said signal from said RFID reader for retrieving said inventory data from said inventory database, said processor triggering said means for deactivation to deactivate said EAS tag, and updating said inventory data in said inventory database for checkout.

40. The apparatus as recited in claim 39 wherein said deactivation electromagnetic field is an AC ringdown pulse with a maximum field level that is less than a level that detectably degrades prerecorded magnetic media.

41. The apparatus as recited in claim 40 wherein said deactivation electromagnetic field level is between about 25 Oe and about 200 Oe within said cavity.

42. The apparatus as recited in claim 41 wherein said deactivation electromagnetic field level is between about 25 Oe and about 125 Oe within said cavity.

43. The apparatus as recited in claim 39 wherein said means for verification of an authorized checkout includes means for reading a membership card and verifying membership, said processor being responsive to said means for verification for triggering said means for deactivating.

44. The apparatus as recited in claim 39 wherein said means for verification of an authorized checkout includes means for reading a credit card and verifying credit, said processor being responsive to said means for verification for triggering said means for deactivating.

* * * * *

UNITED STATES PATENT AND TRADEMARK OFFICE
CERTIFICATE OF CORRECTION

| | |
|---|---|
| PATENT NO. | : 6,169,483 B1 |
| DATED | : January 2, 2001 |
| INVENTOR(S) | : Ghaffari et al. |

It is certified that error appears in the above-identified patent and that said Letters Patent is hereby corrected as shown below:

<u>Title page,</u>
Item [54], Title, change "ELECTRONICS" to -- ELECTRONIC --.

<u>Column 11,</u>
Line 36, change "REFID" to -- RFID --.

<u>Column 12,</u>
Line 58, insert -- an -- at the beginning of the paragraph.

<u>Column 14,</u>
Line 1, change claim dependency from "18" to -- 35 --.
Line 19, change "receive simultaneously" to -- simultaneously receive --.

Signed and Sealed this

Tenth Day of August, 2004

JON W. DUDAS
*Acting Director of the United States Patent and Trademark Office*